United States Patent
Herbeck et al.

(10) Patent No.: US 9,747,239 B2
(45) Date of Patent: Aug. 29, 2017

(54) TRANSACTION FILTER FOR ON-CHIP COMMUNICATIONS NETWORK

(71) Applicant: Apple Inc., Cupertino, CA (US)

(72) Inventors: Gilbert H. Herbeck, Livermore, CA (US); Munetoshi Fukami, Newark, CA (US); Manu Gulati, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 14/467,164

(22) Filed: Aug. 25, 2014

(65) Prior Publication Data
US 2016/0055110 A1   Feb. 25, 2016

(51) Int. Cl.
G06F 1/00      (2006.01)
G06F 13/40    (2006.01)
G06F 1/32      (2006.01)

(52) U.S. Cl.
CPC ........ *G06F 13/4022* (2013.01); *G06F 1/3275* (2013.01); *G06F 1/3296* (2013.01)

(58) Field of Classification Search
CPC ... G06F 13/4022; G06F 1/3275; G06F 1/3296
USPC .................................................. 713/300–340
See application file for complete search history.

(56) References Cited

U.S. PATENT DOCUMENTS

| | | | |
|---|---|---|---|
| 5,521,854 A | 5/1996 | Kadowaki et al. | |
| 5,649,212 A * | 7/1997 | Kawamura | G06F 9/4418 707/999.202 |
| 5,713,029 A * | 1/1998 | Kaiser | G06F 13/364 710/113 |
| 5,752,050 A * | 5/1998 | Hernandez | G06F 1/3203 713/321 |
| 5,790,876 A * | 8/1998 | Shima | G06F 1/32 396/205 |
| 5,826,015 A * | 10/1998 | Schmidt | G06F 21/572 709/229 |
| 5,996,083 A * | 11/1999 | Gupta | G06F 1/3203 712/E9.049 |
| 6,467,042 B1 * | 10/2002 | Wright | G06F 1/3203 713/320 |
| 7,373,449 B2 | 5/2008 | Radulescu et al. | |
| 7,587,525 B2 * | 9/2009 | Dahan | G06F 1/3215 710/22 |
| 7,696,641 B2 * | 4/2010 | Tomita | G06F 1/3203 307/126 |
| 8,051,237 B2 * | 11/2011 | Ryan | G06F 11/004 710/315 |

(Continued)

*Primary Examiner* — Paul R Myers
(74) *Attorney, Agent, or Firm* — Meyertons, Hood, Kivlin, Kowert & Goetzel, P.C.; Erik A. Heter (57) ABSTRACT

A transaction filter for an on-chip communications network is disclosed. In one embodiment, an integrated circuit (IC) include a number of functional circuit blocks, some of which may be placed in a sleep mode (e.g., power-gated). The IC also includes a number of transaction filters that are each associated with a unique one of the functional circuit blocks. Responsive to its associated functional circuit block generating a transaction, a given transaction filter may determine whether the functional circuit block to which the transaction is destined is in a sleep mode. If it is determined that the transaction is destined for a functional circuit block that is currently in the sleep mode, the transaction filter may block the transaction from being conveyed.

20 Claims, 4 Drawing Sheets

(56) References Cited

U.S. PATENT DOCUMENTS

| | | | |
|---|---|---|---|
| 8,504,753 B2* | 8/2013 | Danko | G06F 9/30076 |
| | | | 710/262 |
| 8,555,096 B2* | 10/2013 | Chall | H01L 23/041 |
| | | | 713/322 |
| 9,037,682 B2* | 5/2015 | Das | H04L 65/602 |
| | | | 709/219 |
| 9,538,448 B2* | 1/2017 | Kimura | H04W 40/02 |
| 2003/0128111 A1* | 7/2003 | Sano | H04L 12/403 |
| | | | 340/459 |
| 2006/0161792 A1* | 7/2006 | Paul | G06F 1/32 |
| | | | 713/300 |
| 2008/0162980 A1* | 7/2008 | Dahan | G06F 13/1694 |
| | | | 713/601 |
| 2010/0141399 A1* | 6/2010 | Swope | H04M 1/72569 |
| | | | 340/10.33 |
| 2010/0146169 A1* | 6/2010 | Flachs | G06F 13/36 |
| | | | 710/105 |
| 2010/0153545 A1* | 6/2010 | Mizuno | G06F 1/3203 |
| | | | 709/224 |
| 2012/0151234 A1* | 6/2012 | Teague | H04W 52/0229 |
| | | | 713/323 |
| 2012/0166837 A1* | 6/2012 | Henry | G06F 1/3206 |
| | | | 713/321 |
| 2013/0219096 A1 | 8/2013 | Wang et al. | |
| 2014/0035560 A1 | 2/2014 | Olmos et al. | |

* cited by examiner

TRANSACTION FILTER FOR ON-CHIP COMMUNICATIONS NETWORK

BACKGROUND

Technical Field

This disclosure is directed to integrated circuits (ICs), and more particularly, to controlling transactions in a communications fabric implemented on an IC.

Description of the Related Art

Many modern integrated circuits (ICs), such as those that implement a system on a chip (SoC), include on-chip communications networks of various types. Such on-chip networks may include buses and other types of links between various functional circuit blocks of an IC. These on-chip networks may connect various functional circuit blocks to other functional circuit blocks on the same IC.

Various types of on-chip networks may be implemented on an IC. For example, functional circuit blocks in one type of on-chip network may be connected to other functional circuit blocks through crossbar switches. Bussed networks, in which a number of functional circuit blocks share a common bus are also possible. Peer-to-peer (P2P) networks may be implemented on some IC's as well, wherein each functional circuit block is connected directly to one or more other functional circuit blocks through dedicated connections. Transactions through P2P networks may in some cases be transferred through one or more intermediate functional circuit blocks during transit from a source to a final destination. On chip networks that implement more than one of these types of interconnect schemes are also possible and contemplated.

In order to save power, many functional circuit blocks on an IC may be placed in a sleep mode when idle. Communications between functional circuit blocks that are not in a sleep mode may continue to be conducted when others are in the sleep mode. However, the functional circuit blocks in the sleep mode are not available for communications until awakened and placed back into an active state.

SUMMARY

A transaction filter for an on-chip communications network is disclosed. In one embodiment, an integrated circuit (IC) includes a number of functional circuit blocks, some of which may be placed in a sleep mode (e.g., power-gated). The IC also includes a number of transaction filters that are each associated with a unique one of the functional circuit blocks. Responsive to its associated functional circuit block generating a transaction, a given transaction filter may determine whether the functional circuit block to which the transaction is destined is in a sleep mode. If it is determined that the transaction is destined for a functional circuit block that is currently in the sleep mode, the transaction filter may block the transaction from being conveyed.

In various embodiments, the IC may include a power management circuit coupled to each of the transaction filters. Responsive to a transaction filter inhibiting forward progress of a transaction due to its destination being in a sleep mode, the transaction filter may provide an indication to the power management circuit. Responsive to receiving the indication, the power management circuit may initiate a wakeup of the functional circuit block to which the transaction was destined. Once the destination functional circuit block is in the active state, the power management circuit may provide an indication to the transaction filter that initially inhibited the transaction. Thereafter, the transaction may be conveyed to the functional circuit block to which it was originally intended.

BRIEF DESCRIPTION OF THE DRAWINGS

The following detailed description makes reference to the accompanying drawings, which are now briefly described.

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) (or pre-AIA paragraph six) interpretation for that unit/circuit/component.

DETAILED DESCRIPTION OF EMBODIMENTS

Figure 1:
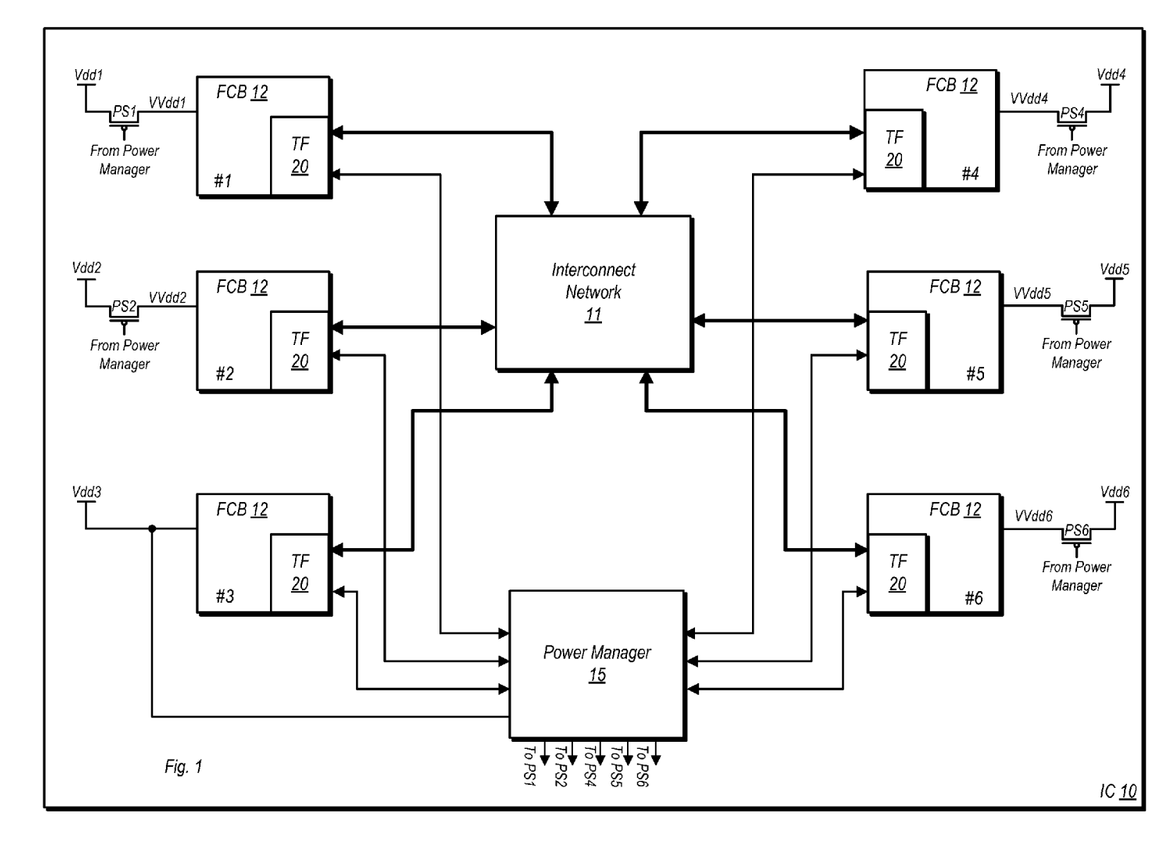
FIG. 1 is a block diagram of one embodiment of an IC including an on-chip network implemented in a number of power domains.

Turning now to FIG. 1, a block diagram of one embodiment of an IC including an on-chip network implemented in a number of power domains is shown. IC 10 in the illustrated embodiment may be a system-on-a-chip or other type of IC. Included in IC 10 are a number of functional circuit blocks 12, each of which is configured to perform one or more of the various functions of IC 10. The functional circuit blocks 12 shown here are numbered, e.g., #1, #2, etc., with these numbers being used at various points in the discussion below. Among the types of circuits implemented in the various instances of functional circuit block 12 are processor cores and subsystems thereof (e.g., execution units), graphics processors, input/output (I/O) units, audio processing circuits, and so forth.

IC 10 includes an interconnect network 11 to facilitate on-chip communications between the various instances of functional circuit block 12. Interconnect network 11 may be implemented in various ways. In one embodiment, interconnect network 11 may be a communications fabric in which each functional circuit block 12 includes at least one dedicated direct connection to at least one other functional circuit block 12. Transactions in such a communications fabric may be conveyed from functional circuit block 12 to another, and may in some cases pass through several functional circuit blocks 12 during transit from source to final destination.

In another embodiment, interconnect network may be implemented using one or more crossbar switches. For example, if interconnect network 11 is implemented as a single crossbar switch in the illustrated embodiment, the crossbar switch may be configured to connect any one of functional circuit blocks 12 to any other one of functional circuit blocks 12.

In still another possible embodiment, interconnect network 11 may include one or more shared buses to which various ones (if not all) of the functional circuit blocks 12 may be connected. The various functional circuit blocks 12 connected to a shared bus may take turns operating as a bus master. Arbitration may be performed such that a single functional circuit block 12 does not consume a disproportionate amount of the bus bandwidth.

In some embodiments, interconnect network 11 may be implemented using a combination of the options discussed above. Implementations of interconnect network 11 that are not explicitly discussed herein are also possible and contemplated as well.

In the embodiment shown, IC 10 may include a number of different power domains. In the illustrated example, there are six power domains, one for each functional circuit block 12 (e.g., Vdd1 is the power source for functional circuit block #1, etc.). Power domains that include two or more functional circuit blocks 12 are possible and contemplated for other embodiments. In five of the six exemplary power domains shown here, the correspondingly coupled functional circuit blocks 12 may be power gated (i.e. powered down) during operation of IC 10. For example, functional circuit block #1 is arranged to receive power from virtual Vdd1 (VVdd1) when power switch 1 (PS1) is active, while power is inhibited from being provided thereto when PS1 is inactive. Control of PS1 (and all the power switches) may be performed by power manager 15. One functional circuit block 12, functional circuit block #3, as well was power manager 15, are in a power domain that is not arranged for power gating, and thus these units remain powered on whenever Vdd3 is supplied from an external source. Moreover, these units are intended to remain powered on at any time IC 10 is operating.

During operation, if it is determined that a particular functional circuit block 12 is idle (either by power manager 15, or the functional circuit block 12 itself), it may be placed in a sleep mode. Placing a functional circuit block 12 into a sleep mode may include removing power therefrom by de-activating a corresponding power switch. Although not explicitly illustrated here, placing a functional circuit block 12 into a sleep mode may also include clock gating, i.e. inhibiting a clock signal from being provided. In some embodiments of IC 10, a functional circuit block 12, upon being determined to be idle, may initially be placed in a sleep mode by clock gating. If the functional circuit block 12 remains inactive, power may be removed therefrom by de-activating its corresponding power switch or switches. In the embodiment shown, clock-gating and power-gating may be controlled by power manager 15.

Power manager 15 may also perform various other power control functions. For example, power manager 15 may in some embodiments control the levels of the supply voltages provided to each of the functional circuit blocks 12. For example, for higher performance demands, power manager 15 may increase the voltage supplied to a functional circuit block 12, while reducing it for lower performance demands. Similarly, power manager 15 may control the frequencies of clock signals provided to the various functional circuit blocks 12, increasing a frequency for higher performance and reducing it for lower performance. Power manager 15 may also control the voltages and clock frequencies provided to the various functional circuit blocks for thermal control, reducing one or both of these quantities if a system temperature exceeds a predetermined threshold. Another function that may be performed by power manager 15 in various embodiments is workload reallocation. For example, in an embodiment in which at least two of the functional circuit blocks 12 are identical processor cores, power manager 15 may reallocate some processing workload from one processor core to another (e.g., for the purpose of limiting thermal output from one of them). Power manager 15 may also perform functions related to the control of transaction flow in IC 10, as will be discussed in further detail below.

In the embodiment shown, each of the functional circuit blocks 12 includes a transaction filter 20. In other embodiments, the transaction filters 20 need not be implemented within their respective functional circuit blocks 12, although they may still be associated with the same. When a functional circuit block 12 generates a transaction (e.g., a packet, a frame, or other information structure) to be transmitted to another destination in IC 10, the transaction may first be received by its corresponding transaction filter 20. The transaction filter 20 may in turn determine if the destination is currently available (e.g., if the intended recipient functional circuit block 12) is active. If the intended destination is active, transaction filter 20 may forward the transaction thereto. However, if it is determined that the intended destination is not active, transaction filter 20 may inhibit the transaction from being transmitted. This may prevent the attempt to transmit information to a functional circuit block 12 that is not active, which can block other traffic and cause other undesirable operation.

Responsive to inhibiting a transaction, a transaction filter 20 may provide an indication of the blocked transaction to power manager 15. The indication may include information indicating the intended destination of the blocked transaction. Responsive to receiving the indication, power manager 15 in one embodiment may initiate a wake-up procedure for the functional circuit block 12 to which the transaction was intended to be conveyed. The wake-up procedure may include restoring a clock signal that may have been inhibited from being provided to the functional circuit block 12, and may also include restoring power thereto. Once the functional circuit block 12 has been fully awakened and is ready to receive transactions, it may notify power manager 15, which may respond in turn by notifying the transaction filter 20 that blocked the transaction. Thereafter, the transaction filter 20 may allow the transaction to proceed to its destination. During the time that a transaction is blocked, a transaction filter 20 may nevertheless allow other transactions originated by its respective functional circuit block 12 to proceed if their respective destinations are active. In addition to notifying the transaction filter 20 of the newly awakened functional circuit block 12, power manager 15 may also notify each of the remaining transaction filters 20 of the same. Accordingly, these remaining transaction filters 20 may allow transactions intended for the newly awakened functional circuit block 12 to be conveyed thereto.

As an alternative to initiating a wake-up of the intended destination, transaction filter 20 may generate an error message that may be returned to the functional circuit block 12 that initiated the transaction. This may indicate to the initiating functional circuit block 12 that the intended destination is not available to receive transactions. As a result, the originating functional circuit block 12 may refrain from initiating additional transactions to that destination until subsequently receiving an indication that it is available. Such an indication may be provided by, e.g., power manager 15.

It is noted while the apparatus discussed above is an IC, with all of the functional circuit blocks 12 implemented thereon, the scope of this disclosure is not intended to be limited in this manner. On the contrary, the subject matter disclosed herein may be applied on a system-wide basis that encompasses embodiments in which some functional circuit blocks 12 are implemented on different IC's from one another. For example, a transaction filter 20 may inhibit a transaction intended for a functional circuit block 12 on another IC but within the same system.

It is further noted that it is not necessary that all functional circuit blocks 12 in an IC or a system include transaction filters. For example, any functional circuit block 12 that is configured only to receive but not transmit transactions may be implemented without a transaction filter 20. Furthermore, a functional circuit block 12 that is coupled to communicate only with circuitry that is configured to remain powered on at all times the IC/system is operating may be implemented without a transaction filter 20. Transaction filters 20 may be implemented in any functional circuit block 12 that is configured to communicate with other circuitry that may be placed in a sleep mode.

Figure 2:
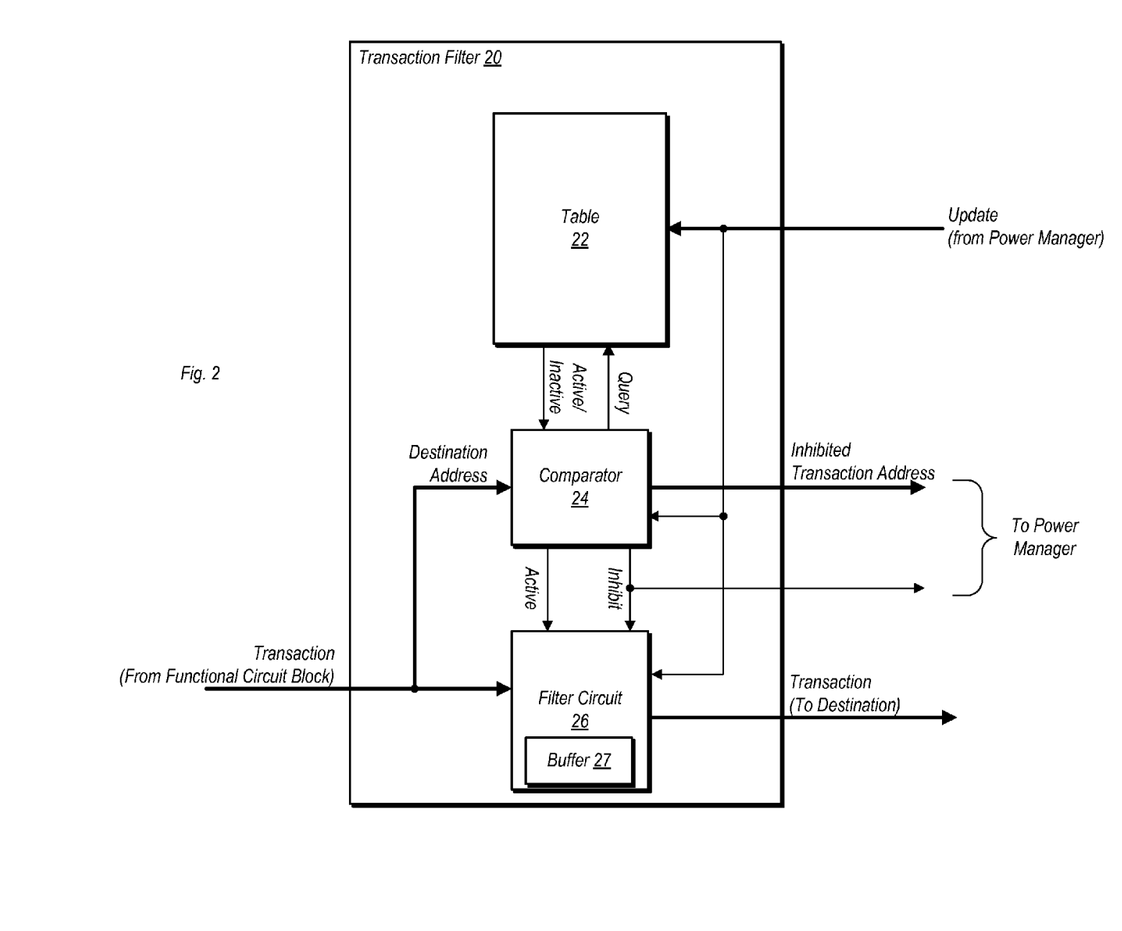
FIG. 2 is a block diagram of one embodiment of a transaction filter.

FIG. 2 is a block diagram of one embodiment of a transaction filter 20. In the embodiment shown, transaction filter 20 is configured to receive a transaction from its corresponding functional circuit block 12. In one embodiment, each instance of a transaction filter may be implemented within its functional circuit block 12. However, embodiments are possible and contemplated in which a transaction filter 20 is implemented separately from the functional circuit block 12 to which it is associated. For example, in an embodiment of an IC that includes a crossbar switch, the transaction filters 20 associated with given functional circuit blocks 12 may be implemented within the crossbar switch itself.

The transaction (e.g., a packet) received from the functional circuit block 12 may be received by a filter circuit 26. An address indicative of the destination of the transaction may be extracted from the transaction and sent to comparator 24. Filter circuit 26 may hold the transaction until a comparison operation is performed, which could occur within the same clock cycle in which the transaction arrives.

Transaction filter 20 also includes a table 22 that is configured to store information indicative of which other functional circuit blocks 12 (or more generally, possible destinations for the transaction) are currently in a sleep mode. Table 22 may take various forms. For example, table 22 may be implemented as a content addressable memory (CAM) in one embodiment. The information stored in table 22 may also take various forms. For example, the information stored in table 22 may include addresses, target address ranges, traffic class information, and identification information for the various possible destinations to which transactions may be conveyed. In an alternate embodiment, it is possible that table 22 stores information indicative of which destinations are currently active, instead of those that are currently inactive. In either case, the information stored in table 22 may be updated from time to time responsive to various functional circuit blocks 12 being placed in a sleep mode or awakened therefrom.

Responsive to receiving the destination address, comparator 24 may conduct a search of table 22 by submitting a query thereto. If the search indicates that the intended destination of the transaction is active, an 'Active' signal may be provided to filter circuit 26. Responsive to receiving the 'Active' signal, filter circuit 26 may forward the transaction into the interconnect network 11 of FIG. 1 where it may be routed to its final destination. On the other hand, if the search indicates that the intended destination of the transaction is inactive, the 'Inactive' signal may be provided to comparator 24. Responsive to receiving the 'Inactive' signal, comparator 24 may assert the 'Inhibit' signal. Responsive to assertion of the 'Inhibit' signal, filter circuit 26 may inhibit the transaction from being forwarded into interconnect network 11.

The asserted 'Inhibit' signal may also be conveyed to power manager 15, along with the address of the inhibited transaction and/or other suitable information. Responsive to receiving the 'Inhibit' signal and the address of the inhibited transaction, the power manager 15 may initiate a wake up procedure to cause the destination to be brought into an active state. This may include restoring a clock signal to the destination functional circuit block 12, and may also include restoring power thereto. When the destination functional circuit block 12 is in a fully active state, it may provide an indication to power manager 15. In turn, power manager 15 may provide an 'Update' signal to Transaction filter 20. The 'Update' signal may include information indicative of the destination (e.g., the address) to table 22, as well as a signal provided to both comparator 24 and filter circuit 26. The information stored in table 22 may be updated to reflect the change in status of the inhibited transaction's destination. Power manager 15 may also provide this information to the transaction filters 20 associated with the other functional circuit blocks 12 so that they can update the information stored in their respective tables 22.

In the embodiment shown, filter circuit 26 includes a buffer 27, which is configured to provide temporary storage for inhibited transactions. Storing inhibited transactions in buffer 27 may allow other transactions to proceed through transaction filter 20 when their respective destinations are available to receive incoming transactions.

Responsive to receiving the 'Update' signal from power manager 15, filter circuit 26 may access the previously inhibited transaction from buffer 27 and re-submit the previously inhibited transaction to comparator 24, which may respond in turn by performing another search of table 22. Since information stored in table 22 will have been updated to indicate that the destination is available to receive transaction, comparator 24 will return the 'Active' signal to filter circuit 26. Thereafter, filter circuit 26 will forward the previously inhibited transaction into the interconnect network 11. In some embodiments, rather than performing another search of table 22, filter circuit may forward the transaction into the network directly responsive to receiving the 'Update' signal from power manager 15.

Figure 3:
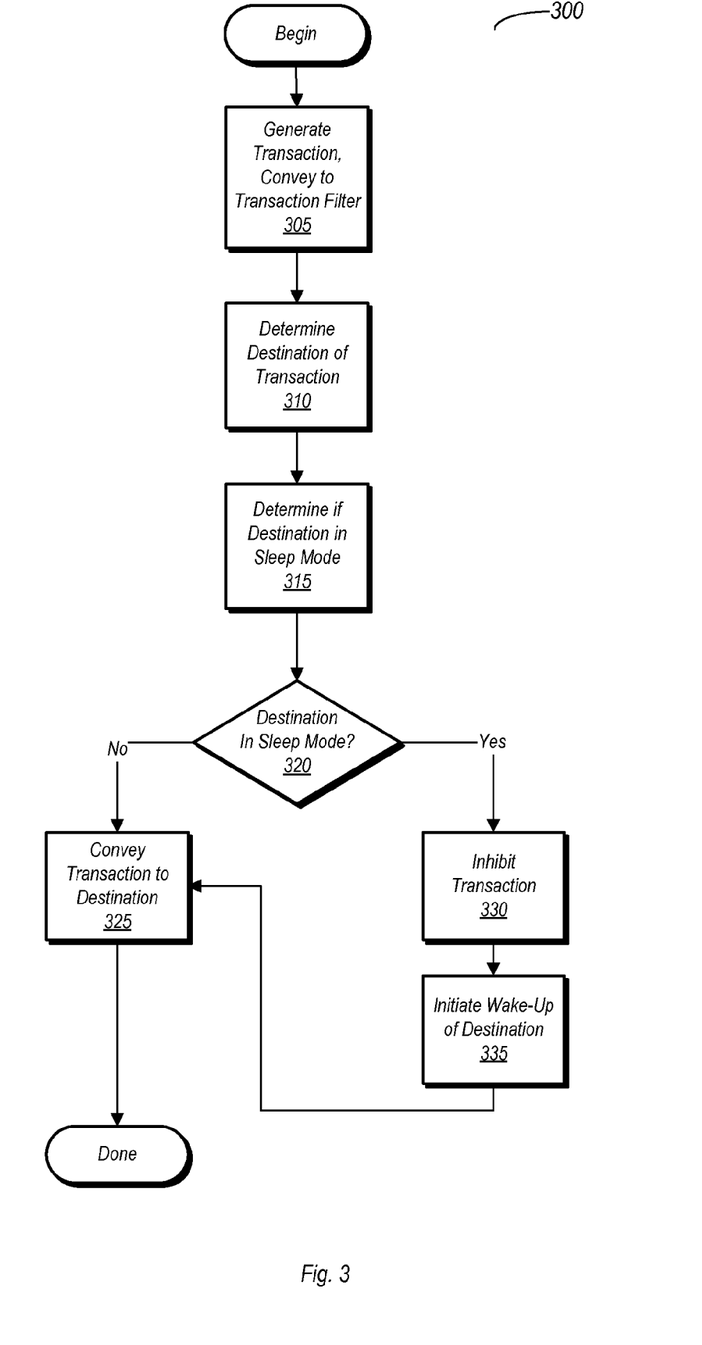
FIG. 3 is a flow diagram illustrating one embodiment of a method for operating an IC having transaction filters.

FIG. 3 is a flow diagram illustrating one embodiment of a method for operating an IC having transaction filters. Method 300 as shown in FIG. 3 may be performed with various embodiments of the hardware shown in FIGS. 1 and 2 and discussed herein. It is further contemplated that hardware embodiments not discussed herein may perform method 300. Still further, it is possible and contemplated that at least some parts of method 300 may be performed using software.

Method 300 begins with the generation of a transaction by a functional circuit block (block 305). The transaction may take various forms, such as a packet, frame, or other information structures, and may be intended to be conveyed to another functional circuit block. The other functional circuit block may be on the same IC as the one originating the transaction, or on a different IC or other part of a system.

The generated transaction may be conveyed to a transaction filter. The transaction filter may determine the destination of the transaction (e.g., the address to which it is to be conveyed; block 310). After determining the destination of the transaction, the transaction filter may determine if the destination is in a sleep mode (block 315). The destination may be considered in the sleep mode if it is clock-gated, power-gated, and/or unable to receive incoming transactions. Determination of the state of the destination (active/inactive) may be performed by comparing the destination to entries in a list that may either indicate which system destinations are active or which of those are inactive.

If the transaction filter determines that the destination is active and thus able to receive transactions (block 320, no), the pending transaction may be conveyed to its destination (block 325). If the transaction filter determines that the destination is in a sleep mode (block 320, yes), then the transaction may be initially inhibited from transmission to its intended destination (block 330). Thereafter, a wake-up of the destination may be initiated (block 335). Upon completion of the wake-up procedure, the transaction may be conveyed to its destination (block 325).

Figure 4:
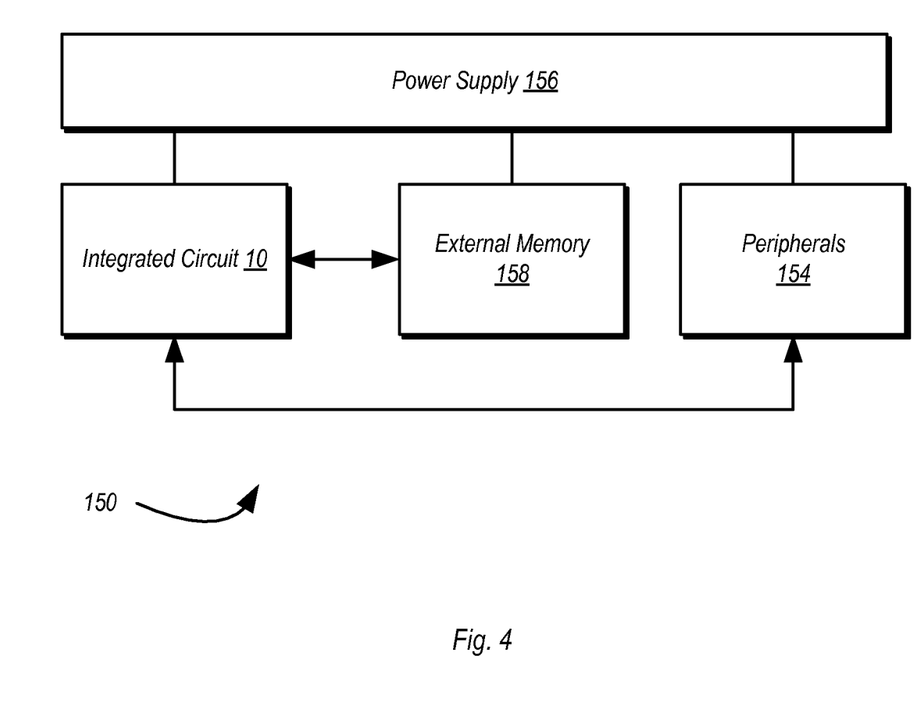
FIG. 4 is a block diagram of one embodiment of an exemplary system.

Turning next to FIG. 4, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit (IC) comprising:
a plurality of functional circuit blocks, wherein a subset of the plurality of functional blocks are configured to be placed in a sleep mode;
an interconnection network configured to couple each of the plurality of functional circuit blocks to one or more additional ones of the plurality of functional circuit blocks; and
a plurality of transaction filters, wherein each of the plurality of functional blocks is uniquely associated with and includes a corresponding one of the plurality of transaction filters, wherein each of the plurality of transaction filters is configured to, responsive to its corresponding functional circuit block generating a transaction destined for another functional circuit block presently in the sleep mode, inhibit forward progress of the transaction, wherein inhibiting forward progress of the transaction comprises preventing transmission of the transaction into the interconnection network from the corresponding functional circuit block in which it was generated.

2. The integrated circuit as recited in claim 1, further comprising a power management circuit, wherein each of the plurality of transaction filters is coupled to provide an indication of an inhibited transaction to the power management circuit, wherein the indication includes an intended destination of the inhibited transaction.

3. The integrated circuit as recited in claim 2, wherein responsive to receiving the indication of inhibiting the transaction, the power management circuit is configured to initiate a wake-up procedure to place the intended destination of the transaction into an active mode.

4. The integrated circuit as recited in claim 3, wherein each of the plurality of transaction filters is configured to receive an awake indication from the power management circuit responsive to the power management circuit determining that a functional circuit block that is an intended destination has been placed in an active mode.

5. The integrated circuit as recited in claim 4, wherein each of the plurality of transaction filters is configured to forward transactions that were previously inhibited responsive to receiving a corresponding awake indication from the power management circuit.

6. The integrated circuit as recited in claim 1, wherein each of the plurality of transaction filters is configured to, responsive to inhibiting a corresponding transaction, provide an indication to its corresponding functional circuit block that an intended destination of the transaction is not currently available to receive transactions.

7. The integrated circuit as recited in claim 1, wherein each of the plurality of transaction filters is configured to, responsive to its corresponding one of the plurality of functional circuit blocks generating a corresponding transaction, compare a destination of the transaction with a list indicating which of the other ones of the plurality of functional circuit blocks are currently in a sleep mode.

8. The integrated circuit as recited in claim 7, wherein each of the plurality of transaction filters is configured to inhibit its corresponding transaction responsive to determining that an address to which it is to be conveyed is on the list indicating which of the other ones of the plurality of functional circuit blocks are currently in a sleep mode.

9. The integrated circuit as recited in claim 1, wherein each of the plurality of transaction filters includes:
   a table configured to store information on which of the plurality of functional circuit blocks is currently in a sleep mode;
   a comparator coupled to receive a destination address of an incoming transaction, wherein the comparator is configured to query the table to determine if the destination address corresponds to a one of the plurality of functional circuit blocks currently in the sleep mode; and
   a filter circuit configured to inhibit forward progress of the incoming transaction responsive to the comparator determining that the destination address corresponds to one of the plurality of functional circuit blocks currently in the sleep mode.

10. The integrated circuit as recited in claim 9, wherein the comparator is configured to provide an indication to a power management circuit that a transaction to one of the plurality of functional blocks has been inhibited, wherein the indication includes providing the destination address.

11. A method comprising:
   generating, in a first one of a plurality of functional circuit blocks in an integrated circuit (IC), a transaction to be conveyed to a second one of the plurality of functional circuit blocks via an interconnection network;
   determining whether the second one of the plurality of functional circuit blocks is in a sleep mode; and
   inhibiting the transaction from being conveyed from the first one of the plurality of functional circuit blocks into the interconnection network responsive to determining that the second one of the plurality of circuit blocks is in a sleep mode, wherein said determining and said inhibiting are performed by a first one of a plurality of transaction filters implemented in the first one of the plurality of functional circuit blocks, wherein each of the plurality of functional circuit blocks is implemented in uniquely associated with a corresponding one of the plurality of functional circuit blocks.

12. The method as recited in claim 11, further comprising:
   the first one of the transaction filters conveying an indication of the transaction being inhibited to a power management circuit; and
   the power management circuit initiating a wake-up procedure to place the second one of the plurality of functional circuit blocks in an active mode.

13. The method as recited in claim 12, further comprising:
   the power management circuit receiving an indication that the second one of the plurality of functional blocks has entered the active mode responsive to the wake-up procedure; and
   the power management circuit providing an indication that the second one of the plurality of functional circuit blocks has entered the active mode to each remaining one the plurality of functional circuit blocks that is currently in the active mode.

14. The method as recited in claim 13, further comprising the first one of the plurality of functional circuit blocks forwarding the transaction that was previously inhibited responsive to receiving the indication that the second one of the plurality of functional circuit blocks has entered the active mode.

15. The method as recited in claim 11, further comprising each of the plurality of transaction filters providing an indication to its corresponding functional circuit block that an intended destination of an inhibited transaction is unavailable for receiving transactions.

16. The method as recited in claim 11, further comprising:
   each of the plurality of transaction filters, when powered on, maintaining a list indicative of the plurality of functional circuit blocks that are currently in the sleep mode
   storing, in the list of each of the plurality of transaction filters, one or more addresses associated for each of the plurality of functional circuit blocks currently in the sleep mode;
   comparing, in a particular one of the plurality of transaction filters, an address associated with a transaction generated by its corresponding one of the plurality of functional circuit blocks;
   forwarding the transaction if the address associated therewith does not match any addresses stored in the list; and
   inhibiting the transaction if the address associated therewith matches an address stored in the list.

17. A system comprising:
   a plurality of functional circuit blocks including a first functional circuit block in a first power domain and a second functional circuit block in a second power domain, wherein each of the plurality of functional circuit blocks is coupled to an interconnection network;
   a power management circuit configured to remove power from the second power domain, including the second functional circuit block, when the second functional circuit block is placed in sleep mode; and
   a first transaction filter implemented in the first functional circuit block, the first transaction filter being one of a plurality of transaction filters each implemented in and uniquely associated with a corresponding one of the plurality of functional circuit blocks, wherein responsive to generation of a transaction by the first functional circuit block that is intended to be conveyed to the second functional circuit block, the first transaction filter is configured to inhibit conveying the transaction from the first functional circuit block into the interconnection network responsive to determining that the second functional circuit is in the sleep mode.

18. The system as recited in claim 17, wherein the power management circuit is configured to initiate a wake-up procedure to place the second functional circuit block in an active state responsive to receiving an indication from the first transaction filter that the transaction generated by the first functional circuit block was inhibited, and wherein the first transaction filter is configured to discontinue inhibiting the transaction responsive to receiving an indication from the power management circuit that the second functional circuit block has been placed in the active state.

19. The system as recited in claim 17, wherein at least a subset of the plurality of functional blocks is configured to be placed in the sleep mode, and wherein each of the plurality of transaction filters is configured to maintain a list indicative of which of the plurality of functional blocks is currently in the sleep mode.

20. The system as recited in claim 19, wherein each of the plurality of transaction filters is configured to, responsive to its respective functional circuit block generating a corresponding transaction, compare a destination of the corresponding transaction to entries on the list indicative of which of the plurality of functional blocks is currently in the sleep mode, wherein each of the plurality of transaction filters is configured to convey the corresponding transaction responsive to determining that no match is found between the destination and the entries on the list.

* * * * *